United States Patent [19]
Harman et al.

[11] Patent Number: 5,941,551
[45] Date of Patent: Aug. 24, 1999

[54] EZ HITCH

[76] Inventors: C. Eric Harman, 215 Wedgefield Crossing, Savannah, Ga. 31405; M. Timothy Warren, 249C Shipyard Rd., Savannah, Ga. 31406

[21] Appl. No.: 08/670,593

[22] Filed: Jun. 26, 1996

[51] Int. Cl.[6] .................................................. B60D 13/00
[52] U.S. Cl. ............................................ 280/494; 280/477
[58] Field of Search ................................. 280/477, 492, 280/494, 515, 491.5

[56] References Cited

U.S. PATENT DOCUMENTS

| | | | |
|---|---|---|---|
| 2,441,285 | 5/1948 | Pfeiffer | 280/477 |
| 4,225,149 | 9/1980 | Koopman | 280/477 |
| 4,585,133 | 4/1986 | Cope | 280/477 |
| 5,549,316 | 8/1996 | Jones | 280/477 |

*Primary Examiner*—Ed L. Swinehart

[57] ABSTRACT

This is an improved trailer hitch apparatus which is self-aligning and essentially self-connecting, and which allows for maximum horizontal and vertical movement of the towed vehicle relative to the towing vehicle. The device includes a plurality of connected guide walls which converge into a spherical housing, having a circular opening at the point of convergence, and a double ring coupler device, which is attached to a standard trailer tongue, having an inner and outer annulus-shaped ring, formed so that the outer ring is a rigid extension of the trailer tongue and the inner ring rotates freely within the said outer ring. The spherical housing device is attached to the interior channel of a standard trailer hitch and when the towing vehicle is backed toward the trailer, the guide walls capture the double ring device, and slides into the spherical housing, and is secured by a coupler pin, which is inserted through the spherical housing vertically through the inner and outer rings.

1 Claim, 4 Drawing Sheets

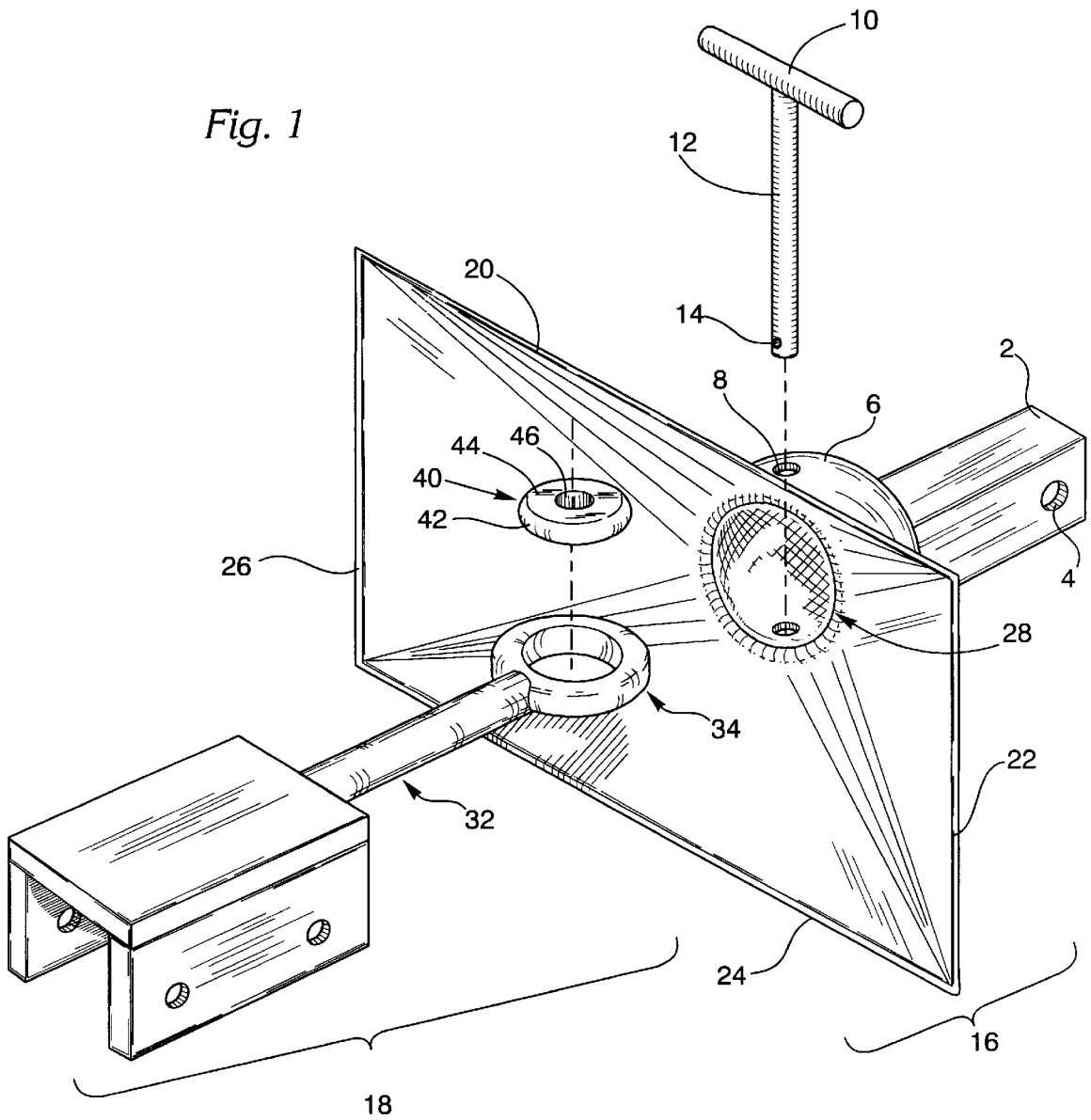

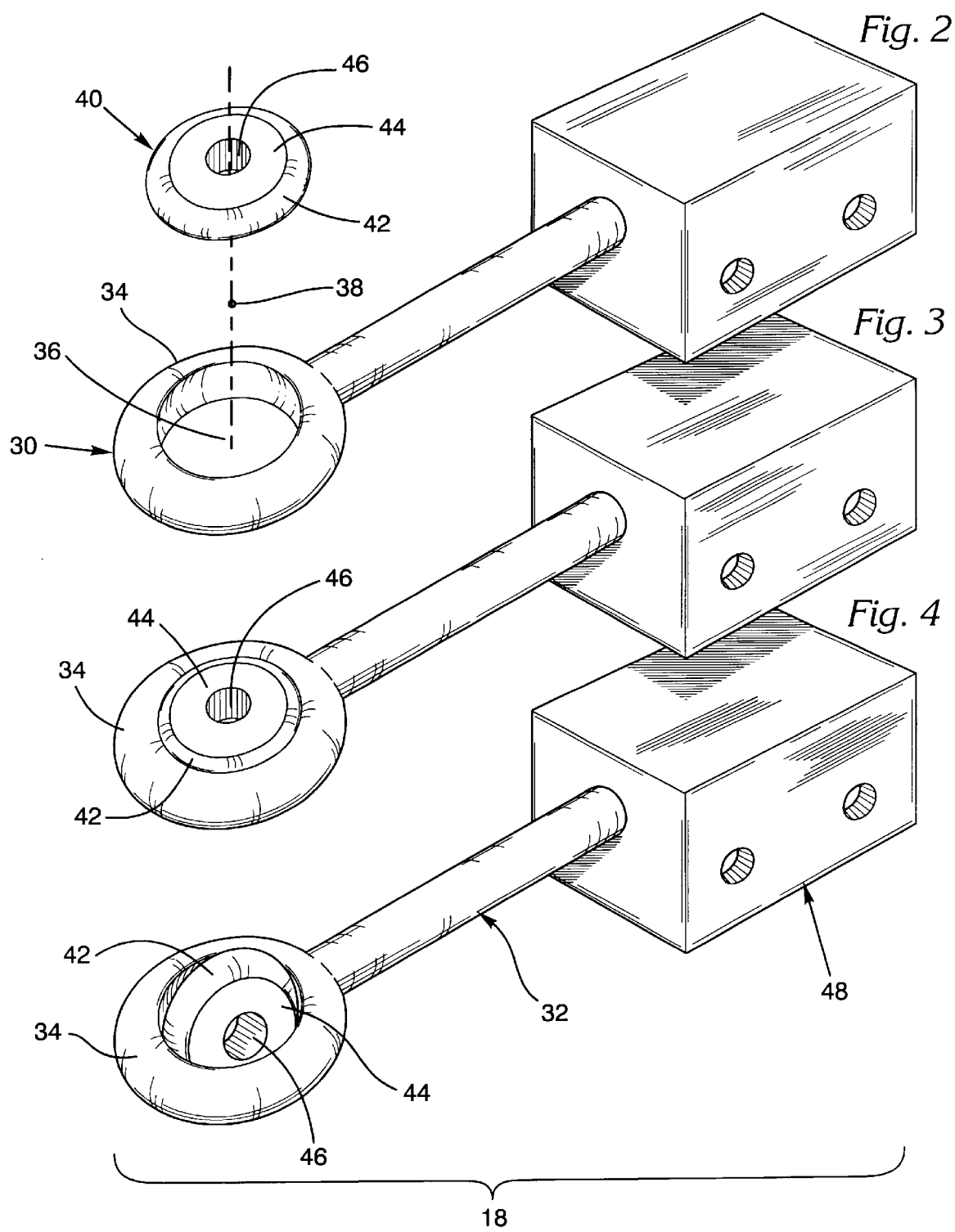

EZ HITCH

BACKGROUND OF THE INVENTION

A new coupling system hitch between a towing vehicle and a towed trailer which is self-aligning, self-connecting, and which allows for maximum horizontal and vertical movement of the towed vehicle relative to the towing vehicle. Unlike the standard ball and socket hitch, the coupler ring hitch assembly consists of two fundamental parts: (1) a coupler ring guide and a housing, the latter having a rearward extending rectangular shaft for attachment to the towing vehicle by insertion of said shaft into a Class II or III trailer hitch channel; and, (2) a double-ring coupler assembly which is guided by a flanged coupler guide into a spherical housing. The coupler ring assembly is held in place by a coupler pin which extends vertically through the spherical housing and through the double ring coupler. Extending from and operatively associated with the spherical housing are flanged walls which diverge rearwardly guiding the coupler ring assembly into the spherical housing. The coupler ring assembly extends outwardly into a rectangular shaft which fits over and is bolted onto the tongue of a towed trailer. The coupler ring assembly consists of an inner ring which is geometrically similar to a lateral section of a sphere. The inner ring is housed within a similarly shaped outer ring in such a way that the outer ring is allowed to rotate three dimensionally about the inner ring thus allowing maximum vertical and horizontal movement of the tongue and towed trailer within the flanged walls of the coupler guide. The double ring coupler assembly allows a maximum and substantial improvement to the range of motion both vertically and horizontally of the trailer tongue and trailer.

DESCRIPTION OF THE PRIOR ART

Nearly all of the prior art related to trailer hitch configurations involve the classic ball and socket hitch. Numerous attempts have been made to align the components involved in the connection between a towing vehicle and a towed trailer and efforts have also been made to physically guide the trailer tongue onto the ball component in order to ease the difficulty of backing the towing vehicle into engagement position with the hitch component on the towed vehicle. The following U.S. Pat Nos. are relevant to this invention:

U.S. Pat. Nos. 4,657,275
4,903,978
5,080,386
4,708,359
4,131,295
3,891,237
3,421,780
2,804,315
4,350,362
4,511,159
4,416,466
4,226,438
4,192,526
3,924,257
5,236,215
5,114,170

One of these provides a means for deflecting the trailer hitch socket into a constrained position and using the vehicles springs to urge the hitch ball up into the socket. Others have used paired horizontally disposed elongated bars, a transmitter and receiver, and even magnetic coupling. U.S. Pat. Nos. 4,657,275 and 4,903,978 provide an aligning structure for a trailer hitch which includes a ramp to elevate the ball socket in relation to the hitch ball. U.S. Pat No. 5,080,386 improves somewhat over those two discloses a structure which not only guides the socket up over and aligns it with the ball, but has a pivoting slide plate which forces the trailer hitch socket down onto the ball rendering engagement. However, all of this prior art is somewhat complicated by use of the classic ball and socket hitching engagement means. Present invention disposes with the cumbersomeness of the ball and socket and thus eliminates the need for slide plates, support legs, release arms, necessary to force a trailer hitch component over and onto a towing vehicle hitch component.

SUMMARY OF THE INVENTION

An object of the present invention is to provide a new self-aligning and self-connecting double ring coupler hitch assembly between a towing vehicle and a towed trailer incorporating a simple flanged structure for guiding a double ring coupler smoothly into a spherical housing where it is locked into place with a coupler pin which falls, with the use of gravity, vertically downward through the spherical housing and the double ring coupler.

Another object of the invention is to provide a new trailer coupling mechanism, as opposed to the classic ball and socket, in accordance with the preceding object in which the trailer hitch component is guided smoothly into engagement with the towing vehicle component without reliance upon other forces such as vehicle springs, ramps, forward slide plates, and other components necessary to force one hitching component, such as a socket, onto another hitching component such as a ball.

Another object of the invention is to provide a hitch in accordance with the preceding objects in which the trailer hitch component consists of a double ring coupling assembly in which the outer ring moves three dimensionally about a fixed inner ring, and which also moves three dimensionally within a spherical housing component, thus allowing maximum movement of the trailer tongue and towed trailer vertically and horizontally within a continuous plane in relation to the rear of the towing vehicle.

These together with other objects and advantages which will become clear reside in the details of construction and operation as hereinafter are more completely described and claimed.

BRIEF DESCRIPTION OF THE DRAWINGS

FIG. 1 is an exploded perspective view of the double ring coupler hitch assembly of the present invention.

FIGS. 2, 3, and 4 are perspective views of the double ring coupler illustrating the relationship of its components, specifically how the inner ring is housed within the outer ring, and how the outer ring with its extending shaft connected to the trailer tongue move freely about the inner ring.

DESCRIPTION OF THE PREFERRED EMBODIMENT

Figure 5:
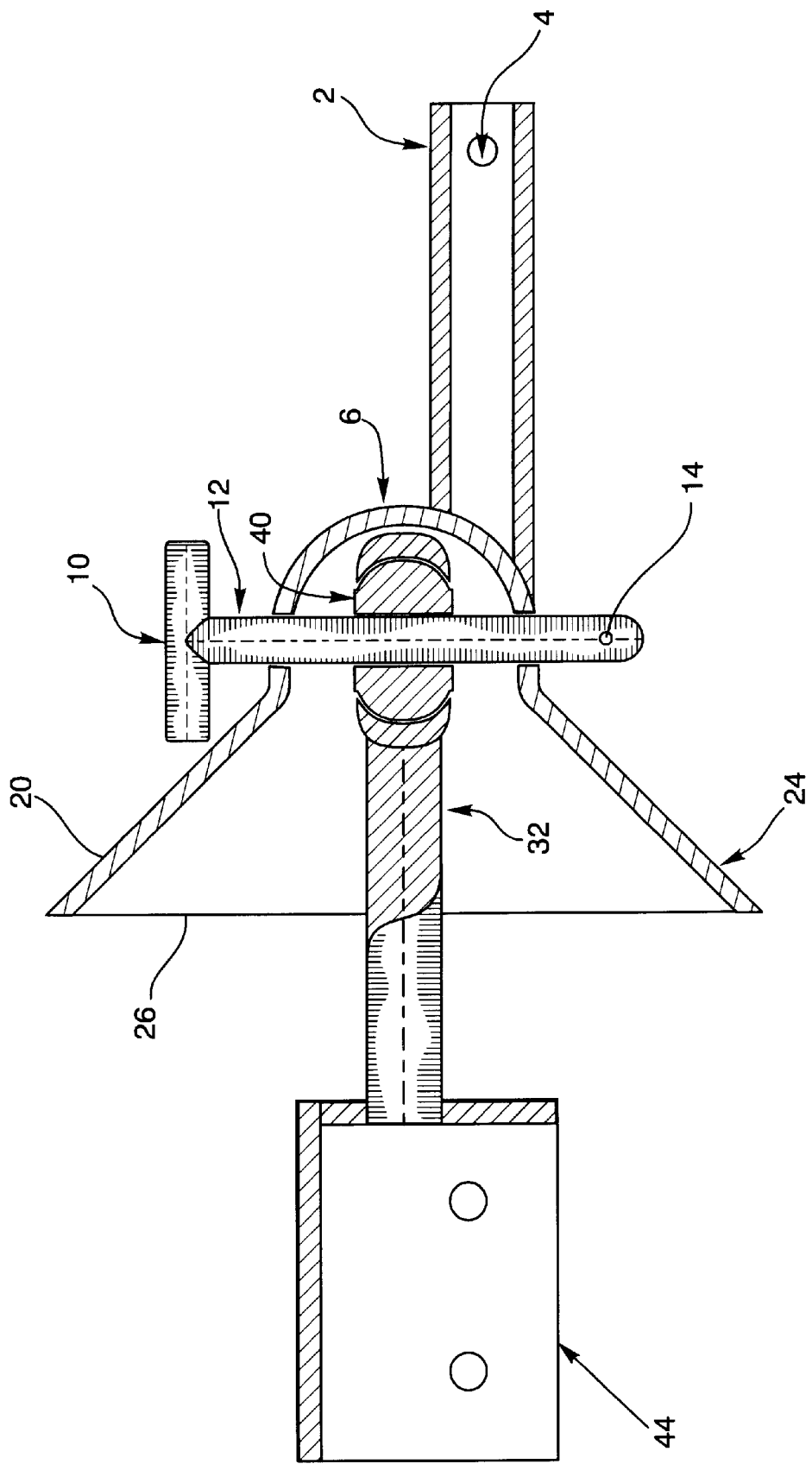
FIG. 5 is a sectional view illustrating the engagement of the double ring coupler within the spherical housing with the inner ring locked in place by the coupler pin.

The double ring hitch assembly is comprised of the coupler guide which is generally designated by reference 16, and the double ring coupler hitch, which is generally designated by reference 18. FIG. 1 is an exploded perspective view of the coupler guide 16 and the double ring coupler 18 and illustrates their structural relationship. The coupler guide 16 consists of a hollowed spherical housing 6 having opposite entrance holes 8 being vertically aligned to allow for the insertion of a locking pin 12. the locking pin 12 is shown as "T" shaped with a handle grip 10, but is not limited to this shape. It has a hole 14 at its base for insertion of a locking pin. Extruding horizontally from the spherical housing 6 is a rectangular shaft 2 which inserts into the interior channel of a class 2 or class 3 towing vehicle hitch. The coupler guide 16 has four guide walls 20, 22, 24 and 26 which converge rearwardly into a circular opening of the spherical housing 6. The preferred embodiment shows the outer perimeter formed by these four guide walls 20, 22, 24 and 26 as rectangular in shape, but the present invention is not limited to said rectangular shape.

The double ring coupler hitch is illustrated in more detail in FIGS. 2, 3 and 4. It is comprised of an annulus shaped outer ring 30 whose exterior surface 34 is spherically shaped, i.e., with the same convex curvature as the interior concave curvature of the spherical housing 6. The outer ring 30 has a circular hole 36 cut through its center so that the interior surface 38 of the outer ring 30 is also concavely curved as the section of a sphere. The inner ring 40 is also annulus shaped with a convexly curved outer surface 42 with the same spherical curvature as the inner surface 38 of the outer ring 30. The inner ring 40 has a hole 46 cut through its center for insertion of the coupler pin 10 between the hole 46 and the outer surface 42. The inner ring 40 has a level lip 44 on both sides. The inner ring 40 fits within the outer ring 30 as illustrated in FIGS. 2, 3 and 4. The concave inner surface 38 of the outer ring 30 covers the outer surface 42 of the inner ring 40 enough to prevent the inner ring 40 from being removed.

The outer ring 30 has a cylindrical shaft 32 which extends horizontally from its outer surface 34 into a hitch box 48. The hitch box 48 has drilled holes for attachment to a trailer hitch tongue. The relative shapes of the inner ring 40 and outer ring 30 are structurally parallel such that the outer ring 30 can rotate about the inner ring 40 360 degrees about any axis, vertical, horizontal or continuously in between.

Figure 6:
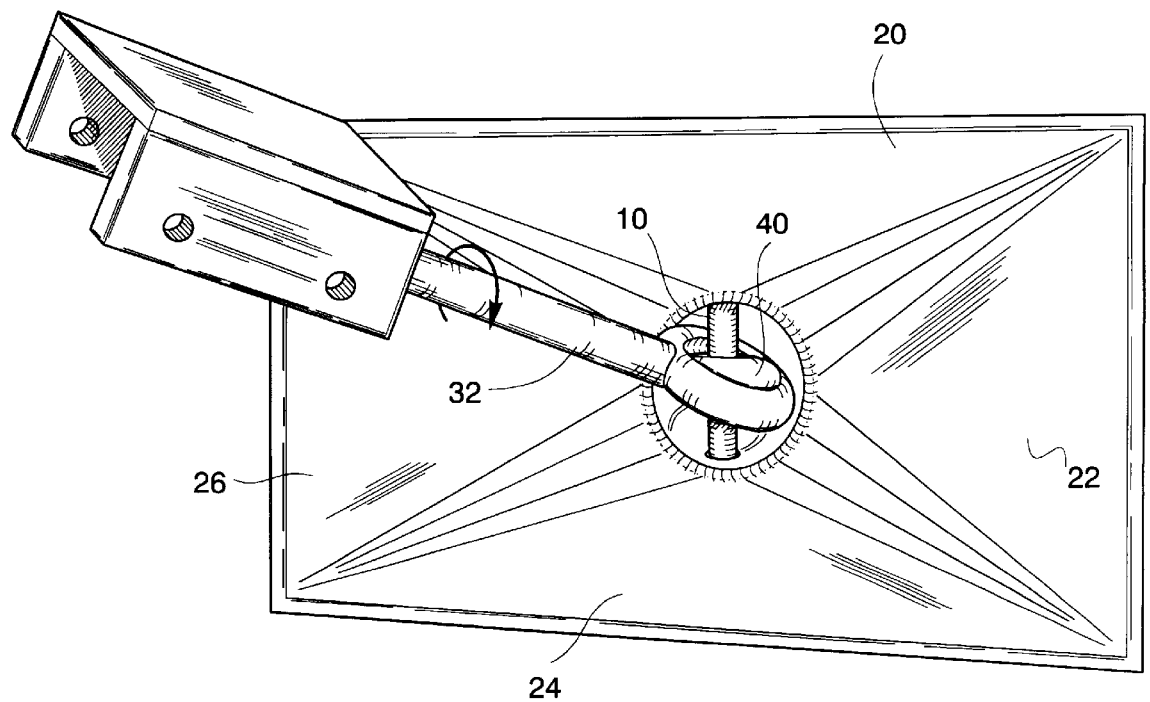
FIG. 6 is a perspective view illustrating the freedom of three dimensional movement of the double ring coupler shaft within the spherical housing and about the inner ring, thus resulting in maximum horizontal, vertical and rotational movement of the trailer tongue and hence trailer.

When mounted to the rear of a towing vehicle, the coupler guide 16 extends perpendicularly from the rear of the towing vehicle which is slowly backed toward the towed vehicle. The double ring coupler assembly 18 extends perpendicularly from the front of the towed vehicle. When the outer ring 30 comes in contact with the inside of one of the four coupler guide walls 20, 22, 24 or 26, the double ring coupler 18 is guided along the inside of the coupler guide walls 20, 22, 24 and 26 which converge and guide the double ring coupler 18 into the spherical housing 6. Once engaged, the coupler pin 10 falls through the hole 8 in the spherical housing 6 and through the hole 46 of the inner ring 40. The inner ring 40 is then locked in place except that it may rotate in either direction about the vertical axis of the locking pin 10. Once so engaged and locked, FIG. 6 illustrates the operational association between the double ring hitch 18 and the coupler guide 16. With the locking pin 10 in place, the double ring hitch 18 is allowed to rotate three dimensionally about the inner ring 40 and within the spherical housing 6 continuously anywhere within the physical boundaries defined by the coupler guide walls 20, 22, 24 and 26. The relative shapes of the inner ring 40, the outer ring 30, and the spherical housing 6 provide a means by which the towed trailer has substantially more freedom of movement both vertically and horizontally relative to the towing vehicle than has been produced or allowed by any prior art.

What we claim is:

1. An improved trailer hitching apparatus comprising:

a plurality of connected guide walls or flanges which converge rearwardly into a substantially spherical housing having a substantially circular opening into said spherical housing where said guide walls converge;

means attached to said spherical housing for mounting said apparatus to a towing vehicle;

a double-ring coupler device having two substantially annulus-shaped rings, formed so that one outer ring houses the other inner ring as follows: the outer convex surface of said inner ring has the same curvature shape as the inner concave surface of said outer ring, with said outer ring somewhat overlapping said inner ring to hold them together operationally, allowing said outer ring to rotate freely on any axis about said inner ring;

a shaft attached to said outer ring having means to attach said coupler device to a trailer tongue;

said spherical housing having an inner surface with the same spherical curvature as the outer surface of said outer ring so that said outer ring can rotate freely and smoothly about any axis within said spherical housing;

said spherical housing having circular surface openings situated opposite each other and said inner ring of said coupler device having a circular hole which aligns with said surface openings as means for insertion of a locking pin device to securely engage said double-ring coupler device within said spherical housing.

* * * * *